Figure 1:
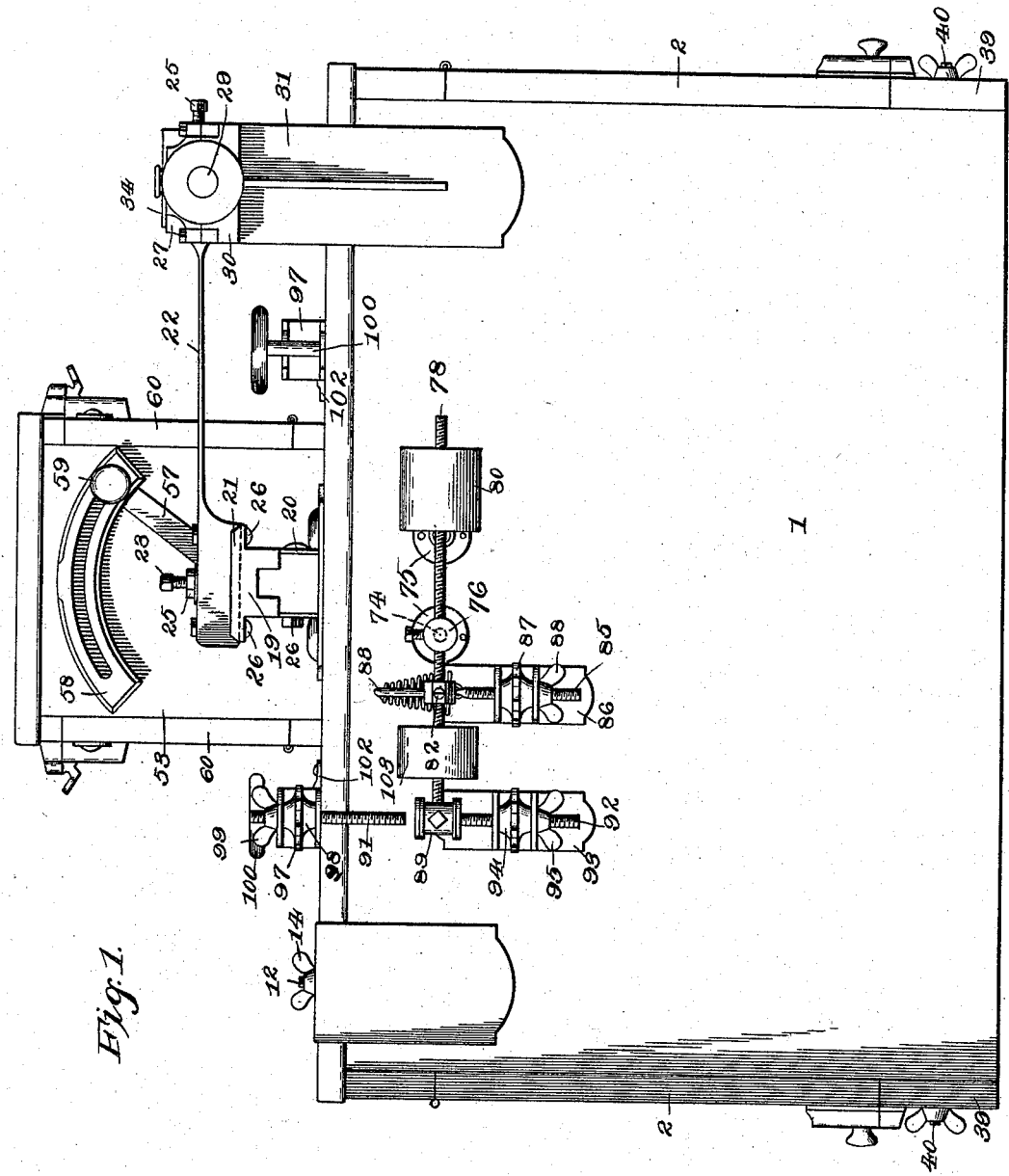

(No Model.) 4 Sheets—Sheet 1.

J. P. WEHRER.
AUTOMATIC FEEDER FOR MILLS.

No. 535,429. Patented Mar. 12, 1895.

Witnesses
Chas. F. Ford
D. P. Holhaupter

Inventor
John P. Wehrer
By his Attorneys.
C. A. Snow & Co.

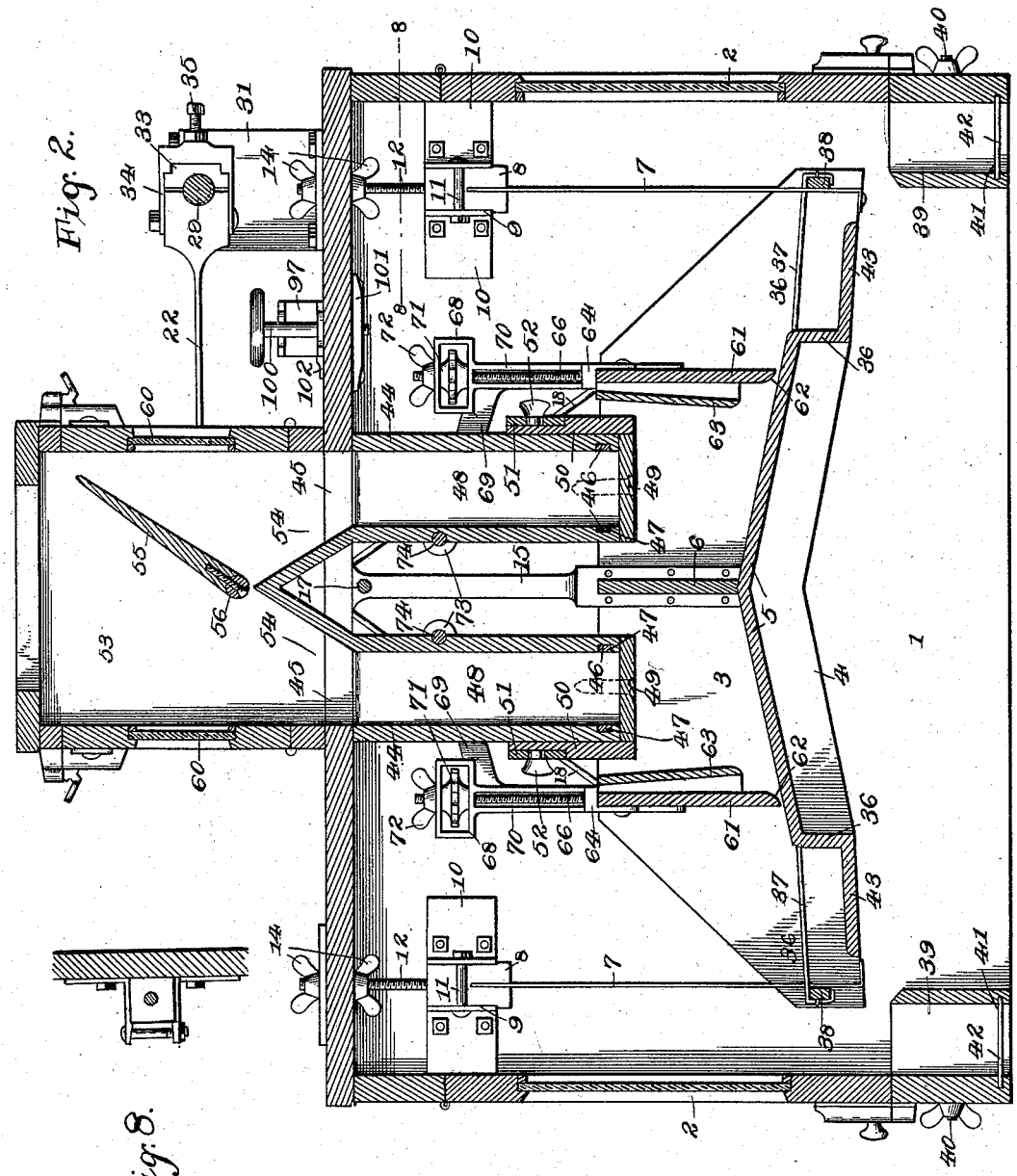

(No Model.) 4 Sheets—Sheet 3.
J. P. WEHRER.
AUTOMATIC FEEDER FOR MILLS.
No. 535,429. Patented Mar. 12, 1895.
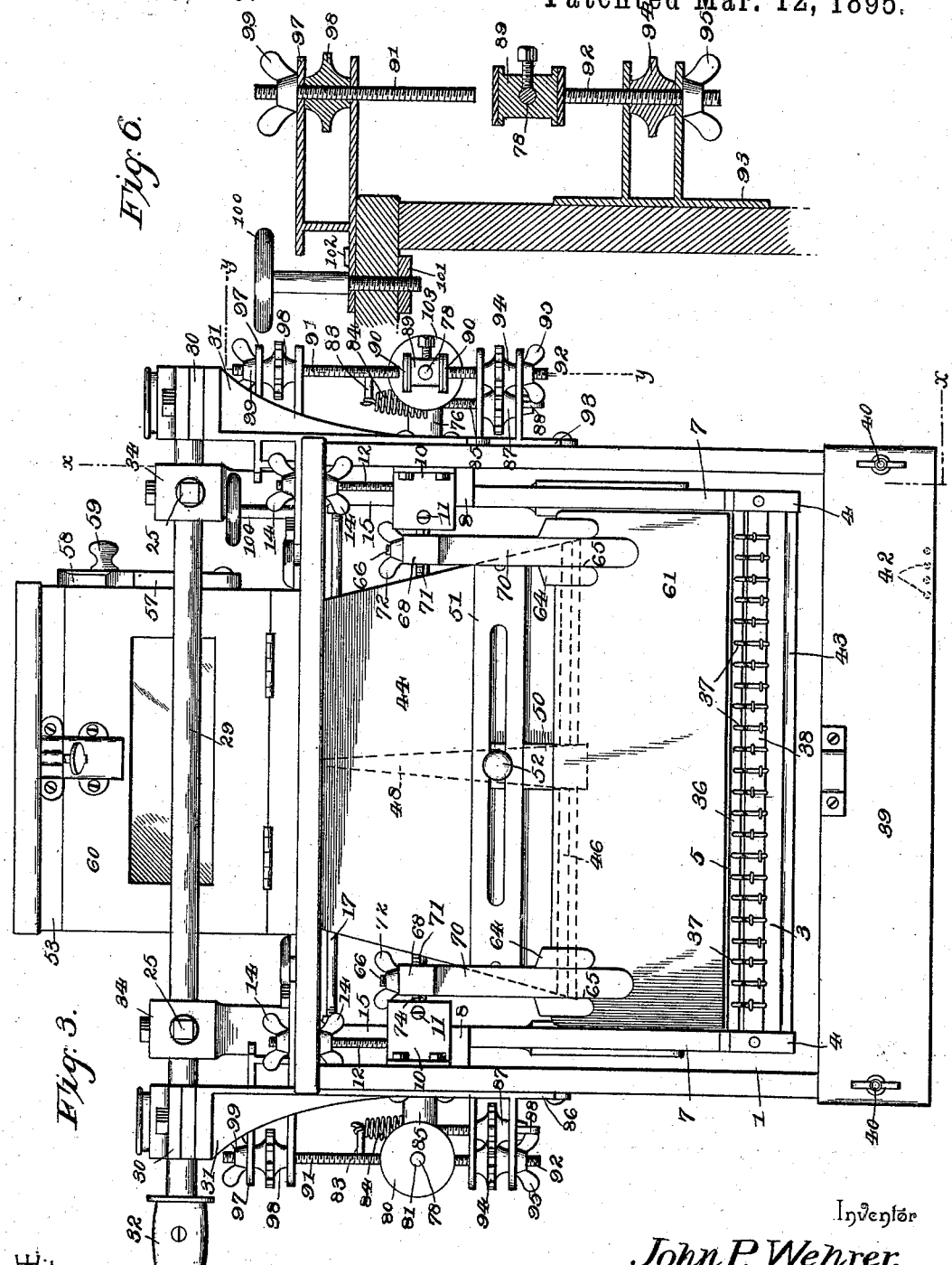
Witnesses
Chas. A. Ford.
D. P. Wolhaupter
Inventor
John P. Wehrer,
By his Attorneys.
C. A. Snow & Co.

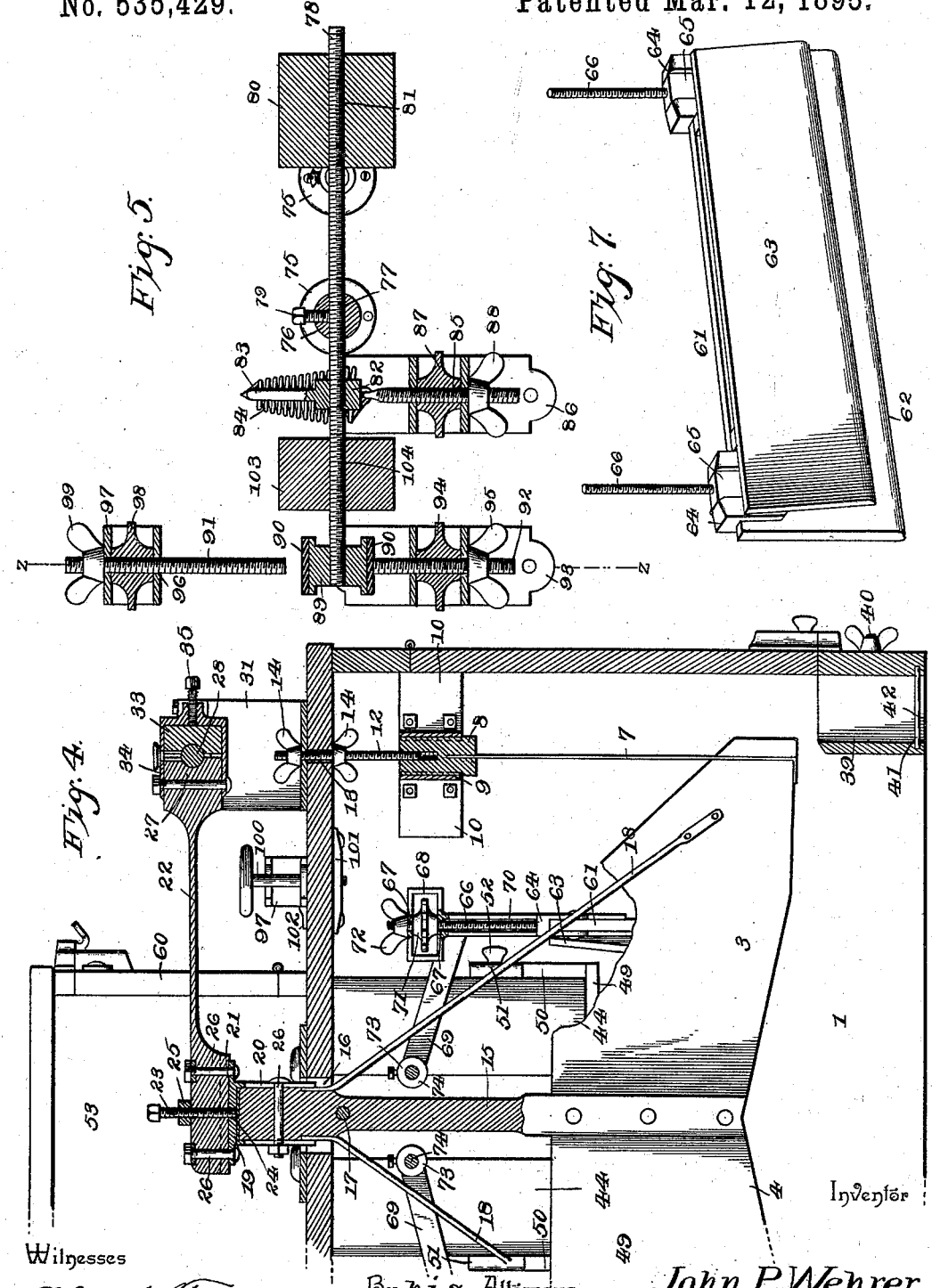

UNITED STATES PATENT OFFICE.

JOHN P. WEHRER, OF LA CROSSE, WISCONSIN.

AUTOMATIC FEEDER FOR MILLS.

SPECIFICATION forming part of Letters Patent No. 535,429, dated March 12, 1895.

Application filed July 10, 1894. Serial No. 517,142. (No model.)

*To all whom it may concern:*

Be it known that I, JOHN P. WEHRER, a citizen of the United States, residing at La Crosse, in the county of La Crosse and State of Wisconsin, have invented a new and useful Automatic Feeder for Mills, of which the following is a specification.

This invention relates to automatic feeders for mills; and it has for its object to effect certain improvements in feeding machines of that character that are designed for use in connection with roller mills, or other machines in a flour mill where an automatic feed of the stock thereto is necessary.

To this end the main and primary object of the present invention is to provide a new and useful automatic feeder for mills having all the necessary adjustments for perfect and effective work, while at the same time having thorough and efficient means for completely extracting all foreign substances such as bolts, nuts, nails, dough-balls and the like, from the stock that is run through the feeder onto the rolls of the particular mill being fed.

With these and other objects in view, which will readily appear as the nature of the invention is better understood, the same consists in the novel construction, combination and arrangement of parts hereinafter more fully described, illustrated and claimed.

In the accompanying drawings:—Figure 1 is a side elevation of a machine constructed in accordance with this invention. Fig. 2 is a central vertical longitudinal sectional view thereof. Fig. 3 is an end view of the machine with one end of the casing removed. Fig. 4 is a vertical sectional view on the line $x$—$x$ of Fig. 3. Fig. 5 is a similar view on the line $y$—$y$ of Fig. 3. Fig. 6 is a detail sectional view on the line $z$—$z$ of Fig. 5. Fig. 7 is a detail in perspective of one of the self-adjusting feed regulating gates. Fig. 8 is a detail sectional view on the line $x$—$x$ of Fig. 2.

Referring to the accompanying drawings, 1 designates a substantially rectangular casing box open at its bottom and adapted to be arranged over a roller, flour or similar mill for the purpose of evenly distributing the stock to the mill by means of the feeding devices arranged inside of said casing box. The casing box 1, is provided with door openings at both ends that are inclosed by the hinged glass doors 2, that admit of convenient access to the interior of the casing for the purpose of adjusting certain parts of the mechanism, while at the same time providing for exposing the working parts of the feeder to view.

Arranged to work inside of the casing 1, to and away from the opposite ends thereof is a longitudinally reciprocating or vibrating feed pan 3. The longitudinally vibrating feed pan 3, essentially comprises the opposite parallel pan sides 4, and intermediate inclined bottom boards 5, that connect the opposite sides 4, and decline toward opposite ends of the pan from a central partition board 6, and at its four corners the said pan 3, is suspended by the spring metal hanger straps 7. The spring metal hanger straps 7, are rigidly secured at their lower ends to the corners of the pan 3, and at their upper ends are permanently secured to the adjustable supporting blocks 8.

The adjustable supporting blocks 8, are preferably rectangular in shape and are received between the inner grooved sides 9, of a pair of parallel angle clamp plates 10. The clamp plates 10, are bolted to opposite inner sides of the casing 1, near the top thereof and are connected together at their inner ends projecting beyond the blocks 8, by the clamp bolts 11, which are tightened or loosened to hold the blocks 8, clamped tightly in their adjusted positions, or to permit such blocks to be adjusted, for the purpose of leveling or properly adjusting the position of the pan 3, with relation to the mill or mills being fed thereby. The said adjustable supporting blocks 8, have fitted in the upper ends thereof the screw rods 12, that loosely project through the guide openings 13, formed in the top of the casing 1, and said screw rods 12, are engaged above and below the top of the casing by the thumb nuts 14, which provide means for raising and lowering the blocks 8, to adjust the position of the pan 3. To elevate the pan 3, it is simply necessary to first loosen the clamp bolts 11, and then the lower thumb nuts on the screw rods under the top of the casing and by then manipulating the thumb nuts on top of the casing, the desired adjustment of the pan will be secured, and the same may be held in this adjusted position by retightening the bolts 11. To lower the pan the upper thumb nuts 14, are loosened and the lower thumb nuts under the top of the casing manipulated to effect the adjustment.

The longitudinally vibrating feed pan, by reason of the supports 7, is suspended within the casing 1, for movement to and from the opposite ends of the casing and provides means for feeding only one mill at a time or a double mill, and secured centrally to opposite sides of the said pan 3, are the lower ends of the upright shaker bars 15, that project through and work in the top slots 16, formed centrally in the top of the casing at opposite sides thereof. The upper ends of said upright shaker bars 15, extend above the top of the casing to provide for making the proper operating connections therewith, and said bars are securely braced together by means of the transverse tie-rod or bolt 17, bolted at opposite ends to the said bars, and the latter are further braced to the opposite sides of the pan 3, by the diagonal brace wires 18, secured at their upper ends to the bars 15, near their upper ends, and at their opposite lower ends to the sides of the said pan.

The upper projecting ends of the upright shaker bars 15 are adapted to adjustably receive thereon the adjustable cap plates 19. The cap plates 19, are provided with the opposite flanged and longitudinally slotted depending strap arms 20, that embrace opposite sides of the said shaker bars, and the horizontal flanged top seat 21, in which are securely bolted one end of the spring eccentric pitmen 22. The adjustment of the said cap plates 19, is secured by means of a set screw 23, working through a threaded opening in one end of the eccentric pitmen 22 and the top of the plates and impinging on the metallic wear plates 24, secured on top of the shaker bars 15, and said set screws are held fast in their adjusted positions by means of the jam nuts 25, working thereon on top of one end of the pitmen 22.

The adjustment of the cap plates 19, is rendered necessary so that the eccentric pitmen may be adjusted correspondingly to the vertical adjustment of the pan 3, in order that the machine will be steady and regular in operation, and said cap plates 19, are held clamped in their adjusted positions by means of the clamp bolts 26, that are arranged in bolt openings in the upper ends of the bars 15, and engaged at opposite ends in the longitudinally disposed slots of the depending strap arms 20, of said cap plates. The said bolts 26, provide for clamping the plates 19, in their adjusted position, while at the same time not interfering with the vertical adjustment thereof.

The pitmen 22, are made of suitable spring material which is necessary in view of their rigid connections at one end to the shaker bars 15, and at their opposite ends the said pitmen are provided with the journal boxes 27, that clamp onto the shaft eccentrics 28, of the transverse drive shaft 29, that is journaled at its opposite end in the bearing boxes 30, at the upper ends of the bearing brackets 31, clamped to the casing at opposite top sides near one end thereof, and said drive shaft 29, has mounted on one end thereof the belt wheel or pulley 32, which receives a belt to provide for transmitting motion to the several working parts of the feeder. The journal boxes 27, of the eccentric pitmen 22, are provided with an adjustable half-box 33, which is embraced by the U-shaped box clamp 34, bolted to the fixed half box and accommodating in the closed end thereof the adjusting set screw 35, that works against the half-box 33, to provide for taking up the wear on the journal boxes 27, in order that the steady and regular running of the machine can be maintained.

The stock that is fed onto the vibrating feed pan 3, at both sides of the central partition board 6 thereof, is directed by the declination of the imperforate inclined bottom boards 5, toward the opposite ends of the pan, and said inclined bottom boards 5, lead up to the inclined separating sieves 36, that form substantial continuations of the boards 5, and extend out to the extreme ends of the opposite sides of the pan. The said inclined front sieves 36, preferably comprise a parallel series of sieve wires 37, fitted at their inner ends into the outer edges of the boards 5 and clamped at their outer ends onto the transverse supporting bar 38, connecting the directly opposite pan sides at their extremities, and said sieve wires are arranged sufficiently close together so as to form a sieve or screen that will permit the stock or flour to pass freely therethrough while at the same time serving to separate from such stock nails, screws, or any foreign substances that sometimes pass with the stock into the mill, and these foreign substances are fed over the outer ends of the sieves 36, by reason of the inclination thereof and the vibration of the pan into the removable end mote boxes 39.

The mote boxes 39, are removably clamped to the opposite ends of the casing below the doors 2, on the bolts 40, and the upper open ends of said boxes are disposed directly under the opposite ends of the pan so as to receive the foreign substances or motes discharged therefrom. The said boxes 39, are provided in their open bottoms with a separating sieve 41, comprising a parallel series of sieve wires 42, arranged somewhat closer together than the wires 37, of the sieve 36, so as to allow all the dust that may accumulate in the machine to pass through to the rolls of the mill being fed, while at the same time retaining within the boxes the foreign substances or motes delivered thereinto from the front sieves 36. The boxes 39 may be removed from time to time from the casing and emptied.

The stock that will pass through the front sieves 36, falls from the outer ends of the inclined bottom boards 5, onto the horizontal steps or distributing boards 43, that are disposed below the plane of the boards 5, and are arranged directly under the front sieves 36, so that all the material that will pass through the said sieves will be caught by the said steps or distributing boards and evenly distributed in a thin sheet or stream over the outer rounded edges 43, thereof, onto the rolls of the mill being fed, this operation being secured by the longitudinal vibrations of the pan 3, which forces the material or stock to be milled over the outer edges of the said steps or distributing boards. The said inclined bottom boards 5, that direct the stock out toward the front sieves and distributing boards therebelow receive the stock thereon at one side of the central partition board 6, from the downwardly flared inclosed feed boxes or chutes 44. The downwardly flared feed boxes or chutes 44, have their lower open ends projecting into the top of the feed pan at both sides of the central partition board 6, thereof, and the upper ends of said boxes or chutes are fitted to the top of the casing under the top feed openings 45, through which the stock is directed into the boxes or chutes. The said boxes or chutes 44, at the lower ends of the opposite sides thereof are provided with the inner parallel slide grooves 46, that accommodate the slide blocks 47, to which are secured the upright pointed dividing plates 48, the upper pointed ends of which extend to the top of the boxes or chutes and provide means for directing the stream of stock to either side of the dividing plates to provide for properly distributing the same onto the inclined bottom boards 5, as the character of the work may demand, and said dividing plates are adapted to be shifted to any adjusted position between the opposite ends of the said boxes or chutes as may be required. The said pointed dividing plates 48 have attached to their lower ends the bottom slide bars 49, that work beneath the lower edges of the said feed boxes or chutes and have attached to one end thereof the adjusting arms 50, that slide on the front sides of the boxes or chutes in rear of the longitudinally slotted clamp strips 51, the slots in which accommodate the thumb clamp screws 52, that also engage the arms 50, to provide means for clamping the same stationary at any point of adjustment, so as to hold the dividing plates 48 rigid in their adjusted positions.

The top feed openings 45, of the casing 1, receive the stock from the hopper box 53, that is mounted on top of the casing. The hopper box 53, receives the material or stock to be fed to the mill in the ordinary manner through the top thereof, and is provided with the separated bottom openings 54, communicating respectively with the separate top feed openings 45, in the top of the casing, and supported for adjustment between the said bottom openings 54, is the pivoted dividing board or valve 55. The dividing board 55, is secured at its lower end to the transverse rock shaft 56, journaled transversely of the hopper box at a point directly above and between the openings 54, to provide means for adjusting the board 55, to a position whereby the stock will be fed to only one of the feed boxes or chutes 44, and therefore to one end of the feed pan, or to both ends of the feed pan if a double mill is being fed. The transverse rock shaft 56, has attached to one end thereof outside of the box 53, the adjusting arm 57, the free end of which works under the slotted segment plate 58, and receives the clamp screw 59, working through the slot of said plate to provide for clamping the arm 57, in any adjusted position to hold the board 55, properly adjusted. Suitable glass doors 60, may inclose the opposite sides of the hopper box for the purposes of access and inspection.

The flow of stock over the bottom boards 5, onto the lower distributing boards 42, is automatically regulated by means of the self-adjusting feed regulating gates 61. The self-adjusting feed regulating gates 61, are arranged to work within the feed pan 3, over the bottom boards 5, directly in front of the feed boxes or chutes 44, and said gates are provided with lower beveled edges 62, to admit of a free and easy run of the material thereunder, and have attached at an angle to the inner sides thereof the shorter back boards 63. The back boards 63, are narrower than the gates 61, and have their lower edges terminate short of the lower edges of the said gates, so as to allow light stock to flow under the gates more freely. By reason of the disposition of the back boards 63, it will be obvious that the full pressure of the accumulations of stock at the rear of the gates will be exerted on said back boards in a direction tending to open the gates very easily when a sufficient quantity of stock has accumulated on the boards 5, directly below the lower ends of the feed boxes or chutes. When the gates 61, are closed it will be noted that the back boards 63, will allow an even sheet of stock to lie against the gates directly below their lower edges, so that when the gates open the flow or stream of stock will be easy and steady, and this prevents bunching of the stock and an irregular flow thereof.

The self adjusting feed regulating gates 61, have attached to their upper edges at opposite ends the U-shaped clamps 64, provided on both sides thereof with the opposite slide grooves 65, and having fitted thereto the lower ends of the screw rods 66, that are adapted to loosely pass through the aligned guide openings 67, formed in the upper and lower sides of the rectangular nut-boxing 68, formed integrally on the free ends of the swinging gate arms 69, and depending from the lower sides of the boxing 68, are the parallel guide straps or arms 70, that embrace the gates 61, and loosely fit in the opposite slide grooves 65, on both sides of the U-shaped clamps 64. The said screw rods 66, accommodate thereon within the boxing 68, the adjusting nuts 71, which provide for raising and lowering the gates 61, to properly adjust the same with relation to the vertical adjustment of the pan 3, and the said screw rods also accommodate thereon, above the boxing 68, the thumb clamp nuts 72, that provide for securing the screw rods 66, against movement after the gates 61, have been properly adjusted.

The gate arms 69, are provided at their inner ends with the shaft collars 73, that are clamped tight on the transverse gate shafts 74, journaled transversely of the casing 1, between the depending feed boxes or chutes 44. The gate shafts 74, are journaled in suitable bearings 75, at opposite sides of the casing, and said gate shafts are projected at one end beyond one side of the casing and have removably clamped thereon the sleeves 76, that are provided in their outer ends with the transverse openings 77, to receive a screw rod 78, that is clamped tight therein by a suitable set screw 79. The screw rod 78, projects beyond both sides of the sleeve to which it is clamped and accommodates thereon at one side of the sleeve the adjustable balancing weight 80, provided with a threaded opening 81, to adjustably engage the screw rod so that the gates 61, may be properly balanced in order that the same will readily open under the pressure of the stock that accumulates at the rear thereof, and will easily adjust themselves to the varying conditions of the stock. Each of said screw rods that are connected to one end of the gate shafts as noted have clamped thereon closely adjacent to the sleeve 76, a collar 82, that carries an upwardly disposed hook arm 83, to which is connected the upper end of the retractile spring 84, the lower end of which is connected to the upper end of the adjusting screw 85, that is arranged in aligned guide openings in an off-standing bracket 86, secured to one side of the casing 1. The said adjusting screw 85, accommodates thereon the adjusting nut 87, that provides for regulating the tension of the spring and is mounted in the bracket, and a thumb nut 88, working below the bracket, and serving to clamp the screw tight in its adjusted position to hold the spring to the tension desired; and it is to be noted that said spring serves to return the feed regulating gates quickly to their normal positions after the same have been elevated or raised by any large foreign substances passing thereunder The screw rods 78, have clamped on one end thereof the stop collars 89, to the upper and lower sides of which are attached the cushions or buffers 90, and said stop collars are arranged to work between the upper and lower screw gage rods 91—92. The lower of said gage rods 92, is disposed vertically and is arranged to work in aligned guide openings in an off-standing bracket 93, a duplicate in construction of the bracket 86, and said gage rod 92, is adjusted up and down by the adjusting nut 94, mounted thereon and supported by the bracket, and is secured in its adjusted position by the thumb nut 95, working below the bracket, and the said lower screw gage rods 70 at opposite sides of the casing serve to limit the closing of the gates 61, and prevent the same from scouring on the bottom of the pan 3, when running empty, and said lower gage rods are ordinarily adjusted so that normally the lower edges of said regulating gates will be set at about one sixteenth of an inch from the inclined bottom boards of the feed pan, so that a thin sheet or stream of stock will be fed under the gates to the boards 42, from which the stock is distributed onto the rolls of the mill. The upper of said screw gage rods 91, are mounted in the aligned bearing openings 96, formed in the outer ends of the swinging brackets 97, and said upper gage rods accommodate thereon the adjusting nuts 98, mounted within the brackets, and the clamping thumb nuts 99, working on top of the brackets. The said swinging brackets 97 are pivotally secured at their inner ends on top of the casing 1, by means of the combined pivot and clamp screws 100, that also engage the screw plates 101 secured to the under side of the top of the casing 1, and by means of thus mounting the brackets 97, the same may be clamped in a stationary position with the rods 91, disposed above the collars 89, to limit the opening of the gates 61, or said brackets may be swung to one side to carry the rods 91, away from the said stop collars 89, this being necessary as the variations in feeding may demand, for it is only necessary to adjust the upper gage rods over the stop collars when there is an overflow of stock caused by a "choke-up" on a preceding machine, and by this arrangement the upper gage rods may be swung into position in a moment so as to prevent the machine from wasting or feeding an excess of stock. When swung into an operative position the brackets 97, engage against the stop plates 102 fastened on top of the casing at one side of said brackets. It is to be further noted that the brackets 97, may be swung out of the way so as to allow any extra large substances or materials to pass freely under the gates 61, without binding the same. The screw rods 78, also accommodate thereon at one side of the collars 82, the smaller regulating weights 103, provided with threaded openings 104, and adapted to be adjusted to and away from the springs 84, so as to provide means for holding the gates 61, closed, until a sufficient quantity of stock has accumulated behind the same to produce an even flow thereunder, and by means of the two weights mounted on the said screw rods and the springs connected therewith, the gates 61, may be adjusted to any degree of sensitiveness so as to open and close quickly to provide for the feeding of an even stream of stock to the rolls, while at the same time not interfering with the free passage of foreign substances out to the end mote boxes 39, and this operation is rendered more effective by disposing the springs 84, quite close to the gate shaft so as to quickly close the gates after opening to allow the passage of large foreign substances.

From the above it is thought that the construction, operation and many advantages of the herein-described feeder will be readily apparent to those skilled in the art, and it will be understood that changes in the form, proportion and the minor details of construction may be resorted to without departing from the principle or sacrificing any of the advantages of this invention.

Having thus described the invention, what is claimed, and desired to be secured by Letters Patent, is—

1. In an automatic feeder of the class described, the combination of the casing, a vibrating feed pan suspended within the casing and provided with inclined imperforate bottom boards declining from both sides of the center thereof, separating sieves forming front extensions of said bottom boards, and horizontal distributing boards disposed below said front sieves in front of the inclined bottom boards, and the hopper, substantially as set forth.

2. In a machine of the class described, the casing, a longitudinally vibrating feed pan arranged within said casing, swinging spring metal hanger straps secured at their lower ends to the corners of said pan, adjustable supporting blocks attached to the upper ends of said straps, angle clamp plates secured to the inner sides of the casing and provided with inner grooved sides embracing said supporting blocks, clamp bolts connecting the inner ends of said clamp plates beyond said blocks, screw rods attached to said adjustable supporting blocks and working through the top of the casing, thumb nuts engaging said screw rods above and below the top of the casing, and the feed devices for said pan, substantially as set forth.

3. In a machine of the class described, the combination of the casing, the swinging feed pan suspended within the casing, upright shaker bars attached to said feed pan and working in slots in the top of the casing, the drive shaft supported for rotation above the casing, operating connections between said drive shaft and the upper ends of said shaker bars, and the feed devices for said pan, substantially as set forth.

4. In a machine of the class described, the combination of the casing, the swinging feed pan adjustably suspended within the casing, upright shaker bars attached centrally to opposite sides of the pan and projecting through slots in the top of the casing, a transverse drive shaft journaled on top of the casing and provided with opposite eccentrics, spring pitmen provided at one end with adjustable boxes clamped on the eccentrics of said shaft, vertically adjustable cap plates provided with opposite flanged and longitudinally slotted strap arms embracing the upper ends of said shaker bars and with horizontal flanged top seats adapted to have clamped therein the other ends of said spring pitmen, clamp bolts passed through the upper ends of the shaker bars and engaging the slots of said strap arms, adjusting set screws working through threaded openings in one end of the pitmen and the top of said cap plates to impinge against the upper ends of said shaker bars, and the feed devices for the pan, substantially as set forth.

5. In a machine of the class described, the combination of the casing open at its bottom and provided at opposite ends thereof with mote boxes, a longitudinally vibrating feed pan supported to swing in said casing and provided with inclined bottom boards and separating sieves in front of said boards, and the feed boxes or chutes arranged to discharge onto the inclined bottom boards of said feed pan, substantially as set forth.

6. In a machine of the class described, the combination of the open bottom casing provided at opposite ends with removable mote boxes having sieve bottoms, the swinging feed pan suspended within the casing and provided with inclined imperforate bottom boards declining from both sides of the center thereof, separating sieves forming front continuations of said bottom boards, and horizontal distributing boards disposed below said front sieves in front of the inclined bottom boards, and the feed boxes or chutes arranged to discharge onto the inclined bottom boards of said feed pan, substantially as set forth.

7. In a machine of the class described, the combination of the open bottom casing, mote boxes removably clamped to opposite lower ends of the casing and provided with sieve bottoms comprising a parallel series of sieve wires, the swinging feed pan suspended within the casing and provided with opposite inclined imperforate bottom boards, inclined separating sieves extended in front of said bottom boards and comprising a parallel series of sieve wires supported with their inner ends fitted in the outer edges of said bottom boards and arranged wider apart than the wires in the bottom of the mote boxes, and the horizontal distributing boards arranged directly under said sieves in front of the inclined bottom boards, and the feed boxes or chutes arranged to discharge onto the inclined bottom boards of said feed pan, substantially as set forth.

8. In a machine of the class described, the combination of the open bottom casing, the swinging or longitudinally vibrating feed pan suspended within the casing and having at both sides of its center inclined bottom boards and separating sieves beyond such boards, downwardly flared feed boxes or chutes secured within the casing directly over the inclined bottom boards of the pan, and pointed dividing plates supported for longitudinal adjustment within said feed boxes or chutes, substantially as set forth.

9. In a machine of the class described, the combination of the open bottom casing, the swinging feed pan suspended within the casing and having opposite inclined bottom boards and separating sieves beyond said boards, downwardly flared feed boxes or chutes secured within the casing directly over said bottom boards of the pan and provided at their lower ends with opposite inner parallel slide grooves, slide blocks mounted to slide in said grooves, upright adjustable dividing plates working within said feed boxes or chutes and attached to said slide blocks, clamp strips attached to the front sides of said feed boxes or chutes, a clamp device attached to said dividing plates and adapted to be adjustably clamped to said clamp strips, and the hopper arranged on top of the casing, substantially as set forth.

10. In a machine of the class described, the combination of the casing, the swinging feed pan having opposite inclined bottom boards and separating sieves, feed boxes or chutes attached to the top of the casing and depending therein directly above said bottom boards, adjustable dividing plates mounted within said feed boxes or chutes, a hopper box mounted on top of said casing and provided with separated bottom openings communicating with the upper ends of the said feed boxes or chutes, a dividing board or valve pivotally mounted within said hopper box, an adjusting arm connected to the pivotal support of said board or valve, and a clamp device for said adjusting arm, substantially as set forth.

11. In an automatic feeder of the class described, the casing, a vibrating feed pan suspended within the casing and provided with an inclined bottom board and a separating sieve, a feed box or chute arranged over said inclined bottom board, and a self adjusting feed regulating gate supported over said inclined bottom board in close proximity thereto in front of said feed box or chute, said gate being provided with a separate back board disposed at an angle thereto and having its lower edge terminating short of the lower edge of the gate, substantially as set forth.

12. In an automatic feeder of the class described, the combination of the casing, a vibrating feed pan suspended within the casing, a feed box or chute arranged over the pan, a transverse gate shaft loosely journaled in the casing, swinging gate arms attached at one end to said shaft, and a self adjusting feed regulating gate adjustably attached to the other free ends of said arms and arranged to work in front of the feed box or chute over the feed pan, substantially as set forth.

13. In an automatic feeder of the class described, the combination of the casing, a vibrating feed pan suspended within the casing, the hopper feeding onto said pan, a transverse gate shaft loosely journaled in the casing, swinging gate arms attached at one end to said shaft and provided at their opposite ends with an open boxing having aligned guide openings and depending parallel guide straps or arms, a self-adjusting feed regulating gate arranged to work within the pan directly over its bottom, U-shaped clamps attached to the upper edge of said gate and provided with opposite slide grooves loosely receiving said guide straps or arms of the swinging gate arms, screw rods attached to said U-shaped clamps and arranged to project through the aligned guide openings of said open boxing, adjusting nuts mounted on said screw rods within said boxing, and thumb clamp nuts mounted on the upper ends of said screw rods on top of said boxing, substantially as set forth.

14. In an automatic feeder of the class described, the combination of the casing, a vibrating feed pan suspended to work within the casing, a hopper feeding onto said pan, a transverse gate shaft loosely journaled in the casing and having off-standing swinging gate arms, a self-adjusting feed regulating gate adjustably attached to said gate arms and working within the pan, said gate shaft projecting at one end outside of the casing, and automatic gate adjusting devices attached to the projecting extremity of said gate shaft, substantially as set forth.

15. In an automatic feeder of the class described, the combination of the casing, the vibrating feed pan within the casing, the hopper, a transverse gate shaft having swinging gate arms carrying a feed regulating gate, a sleeve clamped onto one end of said gate shaft, a screw rod clamped to said sleeve, adjustable balancing and regulating weights having threaded openings engaging said screw rods at both sides of the sleeve, an adjustable retractile spring connected to said screw rod adjacent to said sleeve, and upper and lower gages for one end of said screw rod, substantially as set forth.

16. In an automatic feeder of the class described, the combination of the casing, the vibrating feed pan within the casing, the hopper, a transverse gate shaft having swinging gate arms carrying a feed regulating gate, a sleeve clamped onto one end of said gate shaft, a rod mounted in said sleeve and extending to both sides thereof, balancing and regulating weights adjustably mounted on opposite ends of said rod, a hook arm attached to said rod near to the sleeve, a spring adjusting device arranged below said hook arm, a retractile spring connected at one end to said hook arm and at its other end to said adjusting device, and upper and lower gages for one end of said rod, substantially as set forth.

17. In an automatic feeder of the class described, the combination with the casing, the vibrating feed pan, the hopper and the gate carrying shaft; of a weight and spring adjusted rod secured to one end of said gate shaft and provided at one end with a stop collar, an off-standing bracket secured to one side of the casing, a lower vertically adjustable screw gage rod mounted in said bracket, separate adjusting and thumb nuts engaging said screw gage rods to provide for the adjustment thereof, a swinging bracket arranged above said stop collar, a combined pivot and clamp screw securing said swinging bracket to the top of the casing, and an upper screw gage rod similarly adjustable to the lower gage rod and adapted to be swung in and out of vertical alignment therewith, said stop collar being adapted to play between said gage rods, substantially as set forth.

In testimony that I claim the foregoing as my own I have hereto affixed my signature in the presence of two witnesses.

JOHN P. WEHRER.

Witnesses:
ALEX. WANNER,
ED COLLINS.